United States Patent
Sumi (10) Patent No.: US 9,881,529 B2
(45) Date of Patent: Jan. 30, 2018

(54) DISPLAY DEVICE AND OPERATING METHOD THEREOF

(71) Applicant: Innolux Corporation, Chu-Nan, Miao-Li County (TW)

(72) Inventor: Naoki Sumi, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 269 days.

(21) Appl. No.: 14/738,175

(22) Filed: Jun. 12, 2015

(65) Prior Publication Data
US 2016/0364836 A1   Dec. 15, 2016

(51) Int. Cl.
*G06T 3/20* (2006.01)
*G09G 3/00* (2006.01)
*G02B 3/00* (2006.01)

(52) U.S. Cl.
CPC ....... *G09G 3/00* (2013.01); *G02B 3/00* (2013.01)

(58) Field of Classification Search
CPC .................................. G02B 3/00; G09G 3/00
USPC ............................................................. 345/4
See application file for complete search history.

(56) References Cited

U.S. PATENT DOCUMENTS

| | | | |
|---|---|---|---|
| 5,703,717 A | 12/1997 | Ezra et al. | |
| 6,042,235 A * | 3/2000 | Machtig | G02B 27/2292 348/14.16 |
| 7,054,067 B2 | 5/2006 | Okano et al. | |
| 8,287,127 B2 | 10/2012 | Gao et al. | |
| 8,446,339 B2 | 5/2013 | Tomisawa et al. | |
| 2004/0021802 A1 | 2/2004 | Yoshino et al. | |
| 2010/0182219 A1* | 7/2010 | Tomisawa | G02B 27/2292 345/4 |
| 2014/0233101 A1* | 8/2014 | Takagi | G02F 1/29 359/463 |

FOREIGN PATENT DOCUMENTS

| | | |
|---|---|---|
| CN | 1220073 C | 9/2005 |
| TW | 201502589 A | 1/2015 |

OTHER PUBLICATIONS

Taiwanese Office Action dated Oct. 27, 2016.

\* cited by examiner

*Primary Examiner* — Tony Davis
(74) *Attorney, Agent, or Firm* — Rabin & Berdo, P.C.

(57) ABSTRACT

A display device and an operating method thereof are provided. The display device includes a display module for providing an original image, a optical component, a sensing module, and a control module. The optical component is for projecting a translating image of the original image and includes a first LC GRIN lens array, and a second LC GRIN lens array arranged parallel to the first LC GRIN lens array. The control module is for receiving an object information from the sensing module and adjusting the translating image by applying a first bias arrangement to the first LC GRIN lens array and a second bias arrangement to the second LC GRIN lens array according to the object information.

18 Claims, 7 Drawing Sheets

DISPLAY DEVICE AND OPERATING METHOD THEREOF

TECHNICAL FIELD

The disclosure relates in general to a display device and an operating method thereof, and more particularly to a floating image display device with flexible human interaction and an operating method thereof.

BACKGROUND

Recently, floating image displays have become a developing new technology. In a floating image display, an original image from a display screen is transferred to show a floating image in the air. The development of floating image would be a promising start for human interactive display devices in the future.

While the currently developed floating images still suffer from a number of issues to be solved, such as limited viewing zones of floating images, low qualities of floating images, and etc., how to provide floating images having good qualities and suitable for human interaction has become a prominent task to the industries.

SUMMARY

The disclosure is directed to a display device and an operating method thereof. In the embodiments, by detecting an object by a sensing module, the information of the object's position and/or angular movements can be feed back to a control module, and bias arrangements applied to the LC GRIN lens arrays can be adjusted according to the received object information for adjusting the translating image to be projected, allowing a more flexible human interaction with the image.

According to one embodiment of the disclosure, a display device is provided. The display device includes a display module, an optical component, a sensing module, and a control module. The display module is for providing an original image. The optical component is disposed on the display module for projecting a translating image of the original image and includes a first liquid crystal (LC) gradient index (GRIN) lens array having a first focal length, and a second LC GRIN lens array having a second focal length and arranged parallel to the first LC GRIN lens array. The sensing module is for detecting an object. The control module is for receiving an object information from the sensing module and adjusting the translating image by applying a first bias arrangement to the first LC GRIN lens array and a second bias arrangement to the second LC GRIN lens array according to the object information.

According to another embodiment of the disclosure, an operating method of a display device is provided. The operating method includes the following steps: providing an original image from a display module; projecting a translating image of the original image by an optical component, the optical component including a first LC GRIN lens array having a first focal length, and a second LC GRIN lens array having a second focal length and arranged parallel to the first LC GRIN lens array; detecting an object by a sensing module; receiving an object information from the sensing module by a control module; and adjusting the translating image by the control module, wherein the control module adjusts the translating image by applying a first bias arrangement to the first LC GRIN lens array and a second bias arrangement to the second LC GRIN lens array according to the object information.

According to a further embodiment of the disclosure, an operating method of a display device is provided. The operating method includes the following steps: providing an original image from a display module; projecting a translating image of the original image by an optical component, the optical component including a first LC GRIN lens array having a first focal length, and a second LC GRIN lens array having a second focal length and arranged parallel to the first LC GRIN lens array; capturing an image of an object by an image capture device; receiving and analyzing the image from the image capture device by a control module; and adjusting the translating image by the control module, wherein the control module adjusts the translating image by applying a first bias arrangement to the first LC GRIN lens array and a second bias arrangement to the second LC GRIN lens array according to the received image.

The above and other aspects of the invention will become better understood with regard to the following detailed description of the preferred but non-limiting embodiment(s). The following description is made with reference to the accompanying drawings.

DETAILED DESCRIPTION

According to the embodiments of the disclosure, in the display device, by detecting an object by a sensing module, the information of the object's position and/or angular movements can be feed back to a control module, and bias arrangements applied to the LC GRIN lens arrays can be adjusted according to the received object information for adjusting the translating image to be projected, allowing a more flexible human interaction with the translating image.

Detailed descriptions of the embodiments of the disclosure are disclosed below with accompanying drawings. In the accompanying diagrams, the same numeric designations indicate the same or similar components. It should be noted that accompanying drawings are simplified so as to provide clear descriptions of the embodiments of the disclosure, and the following detailed description are exemplary and explanatory only and are not restrictive of the disclosed embodiments as claimed. Anyone who is skilled in the technology field of the disclosure can make necessary modifications or variations to the structures according to the needs in actual implementations.

Figure 1:
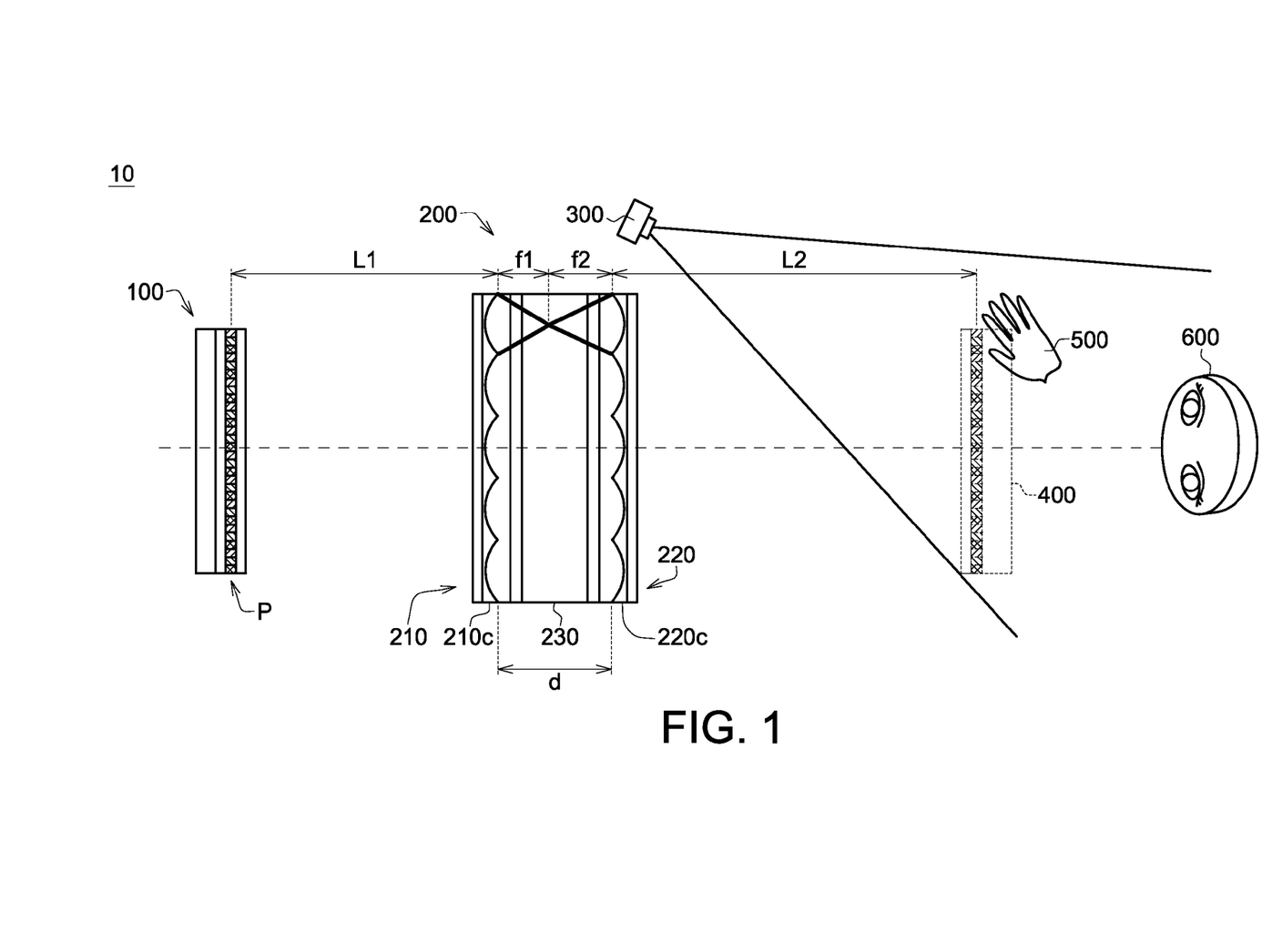
FIGS. 1-4 are schematic views of a display device according to an embodiment of the present disclosure.

FIG. 1 is schematic view of a display device 10 according to an embodiment of the present disclosure. Referring to FIG. 1, the display device 10 includes a display module 100, an optical component 200, a sensing module 300, and a control module (not shown in drawings). The display module 100 is for providing an original image (a 2D image or a 3D image), and the optical component 200 is disposed between the display module 100 and the observer (viewer)

for translating the original image to a translating image 400 (a floating image). The optical component 200 includes a first liquid crystal (LC) gradient index (GRIN) lens array 210, a second LC GRIN lens array 220, and a transparent interlayer 230. The LC GRIN lens including lenticular type LC cell and electrodes. The lenticular type cell pattern is formed by organic materials for filling liquid crystal to create lenticular lens shape. The first LC GRIN lens array has a first focal length f1, and the second LC GRIN lens array 220 having a second focal length f2. The first LC GRIN lens array 210 and the second LC GRIN lens array 220 are arranged back to back (opposite to each other). The focal lengths from the focal plates of the first LC GRIN lens array 210 and the second LC GRIN lens array 220 are opposite to each other. The lenticular lens extending direction of the first LC GRIN lens array 210 and the second LC GRIN lens array 220 are parallel to each other. In the first LC GRIN lens array 210 and the second LC GRIN lens array 220, the first focal length f1 and the second focal length f2 are adjustable by varying applied voltages. The transparent interlayer 230 is disposed between the first LC GRIN lens array 210 and the second LC GRIN lens array 220 for adhering or optical modulating.

In the embodiments, the first LC GRIN lens array 210 and the second LC GRIN lens array 220 may be formed of one dimensional-arranged lenticular lens (stripe type lens), two dimensional lens array of micro lens (bump type lens), or the combination of both. However, the selections of types of the LC GRIN lens array 210 and the second LC GRIN lens array 220 may vary according to actual needs and are not limited thereto.

In the embodiment, the transparent interlayer 230 may be a glass layer, a transparent plastic layer, a transparent glue layer, or air.

In the embodiment, the sensing module 300 is for detecting an object, such as detecting an object's position or movement. For example, as shown in FIG. 1, the object is such as a viewer's hand 500 or a viewer's eyes 600 located near the floating image 400. In other embodiments, the sensing module 300 detects the view's head, fingers or other features.

In the embodiment, the control module (not shown in drawings) is for receiving an object information from the sensing module 300 and adjusting the translating image 400. The object information may include a position of the object, a viewing angle from a position of the object, and/or an image of the object. The translating image 400 is adjusted by the control module by applying a first bias arrangement to the first LC GRIN lens array 210 and applying a second bias arrangement to the second LC GRIN lens array 220 according to the object information until the translating image 400 reaches a predetermined criteria. In the present disclosure, the bias arrangement refers to a series of predetermined voltages applied to a series of corresponding electrodes of the first or the second LC GRIN lens array to modulate the arrangement pattern of liquid crystal. In the embodiments, the first bias arrangement may be the same as or different from the second bias arrangement.

In the embodiment, the predetermined criteria may include a target position of the translating image 400 according to the object information, a target sharpness value of the floating image, or a combination of both. That is, after the object, e.g. a hand 500 or eyes 600, is detected, and the object information is sent back to the control module, followed by the control module analyzing the object information and deciding the applied voltages of the first bias arrangement and the second bias arrangement to adjust the projected translating image 400 for reaching a target position or a target sharpness value.

In the embodiments of the present disclosure, the sensing module 300 may include a body tracking module, an image capture device, or a combination of both. In the embodiment, the body tracking module may be such as a depth sensor using time of flight (TOF) mechanism in combination of a normal CCD/CMOS sensor, an IR sensor, a dual camera, an ultrasonic sensor, or other types of optical systems.

In summary, according to the embodiments of the present disclosure, by detecting an object by the sensing module 300, the information of the object's position and/or angular movements can be sent to the control module, and bias arrangements applied to the LC GRIN lens arrays 210 and 220 can be adjusted according to the received object information for adjusting the translating image 400 to be projected, allowing a more flexible human interaction with the translating image 400.

According to the embodiments of the present disclosure, an operating method of the display device 10 is provided as well. Referring to FIG. 1, in an embodiment, the operating method includes the following steps.

An original image is provided from the display module 100, and the translating image 400 of the original image is projected by the optical component 200. When an object is detected by the sensing module 300, the object information of the object from the sensing module 300 is feed back to the control module. And then, the control module adjusts the translating image 400 by applying a first bias arrangement to the first LC GRIN lens array 210 of the optical component 200 and applying a second bias arrangement to the second LC GRIN lens array 220 of the optical component 200 based on the received object information. The above steps of detecting the object, receiving the object information, and adjusting the translating image 400 by applying the first bias arrangement and the second bias arrangement may repeat until the translating image 400 reaches a predetermined criteria, such as a target position of the translating image 400 according to the object information, a target sharpness value of the translating image 400, or a combination of both. Since varying the applied voltages to the first and second LC GRIN lens arrays 210 and 220 may change the tilt angles of the liquid crystal molecules therein, thereby varying the optical properties of the first and second LC GRIN lens arrays 210 and 220, the projected translating image 400 can be adjusted accordingly.

As shown in FIG. 1, the step of adjusting the translating image 400 may include adjusting the first focal length of the first LC GRIN lens array 210 and adjusting the second focal length of the second LC GRIN lens array 220 until the translating image 400 reaches a target position. In such case, the first focal length and the second focal length are adjusted for satisfying the following condition:

$$d = f1 + f2 \text{ and } L2 = L1 * (f2/f1)$$

f1 is the first focal length, f2 is the second focal length, d is the optical gap between the first LC GRIN lens array 210 and the second LC GRIN lens array 220, L1 is a distance between the first LC GRIN lens array 210 and the display module 100, and L2 is a distance between the second LC GRIN lens array 220 and an original position of the translating image 400. It is to be noted that despite the optical gap is defined by optical parameters of focal lengths, the optical gap d described herein is substantially equal to the distance between the center of the liquid crystal layer 210c of the first LC GRIN lens array 210 and the center of the liquid crystal layer 220c of the second LC GRIN lens array 220. Moreover, the distance L1 is substantially equal to the distance between the pixels P and the center of the liquid crystal layer 210c of the first LC GRIN lens array 210, and the distance L2 is substantially equal to the distance between the center of the liquid crystal layer 220c of the second LC GRIN lens array 220 and the original position of the translating image 400.

Figure 2:
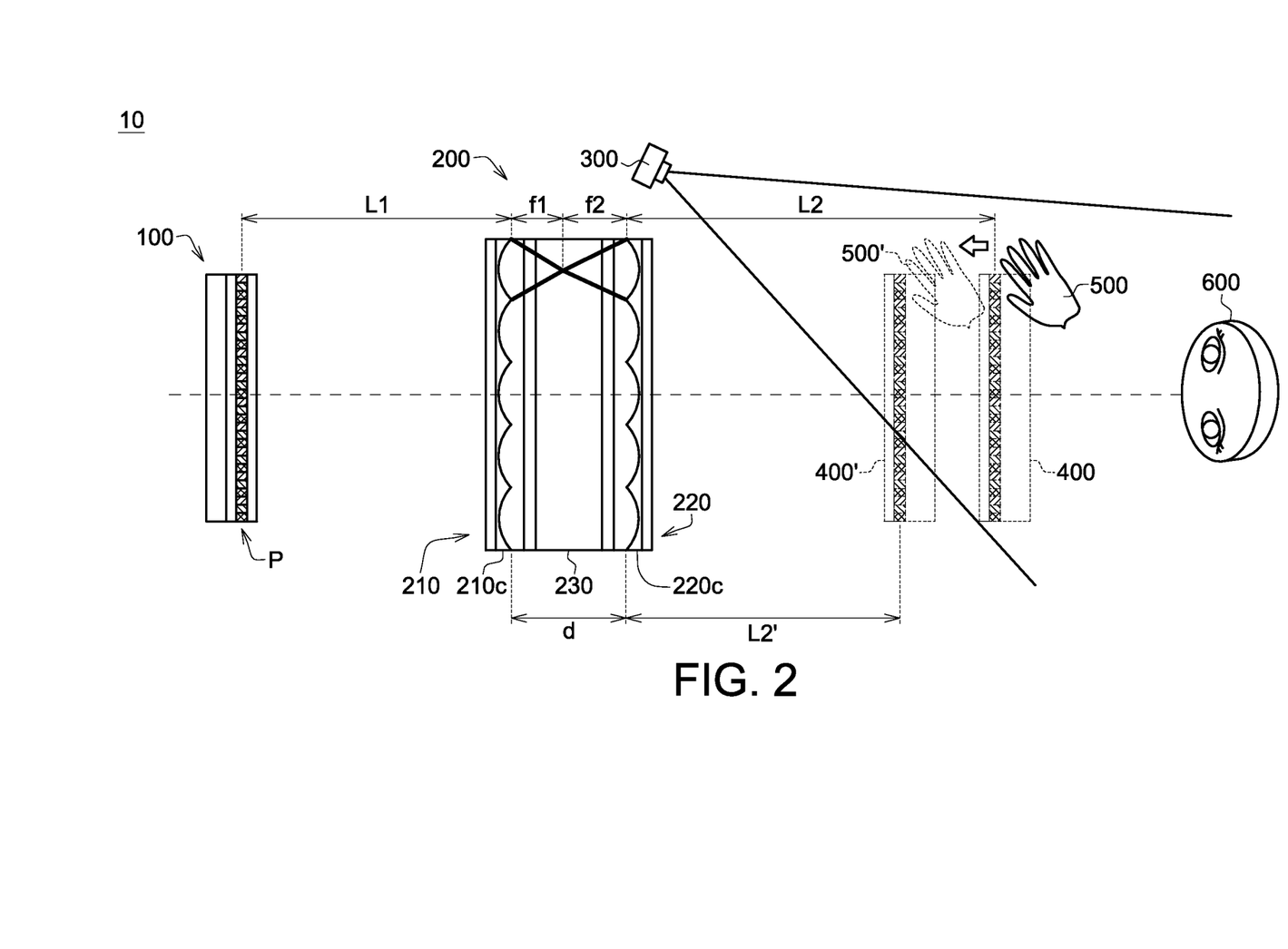

FIG. 2 is schematic view of the display device 10 according to an embodiment of the present disclosure showing an operating method thereof. In the present embodiment, the display device 10 can detect the movement of an object, such as a viewer's hand, eyes or gaze movement, and adjust the translating image to be projected at an adjusted position according to the new position of the object, allowing a more flexible human interaction with the translating image.

Referring to FIG. 2, the sensing module 300 may include a body tracking module, and the object information may include a position of the object. To be more specifically, the object information may include not only the original position of the object but also the new position of the object after the object is moved. In addition, the object information may further include a distance between the second LC GRIN lens array 220 and the position of the object, and the first focal length and the second focal length are adjusted for satisfying the following condition:

$$f1=(L1/(L1+L2'))*d, f2=(L2/(L1+L2'))*d$$

L2' is the distance between the second LC GRIN lens array 220 and the position of the object, e.g. the new position of the object after movement. For example, when an object, such as a hand 500, is moved to a new position, as indicated as the hand 500', the control module adjusts the first focal length f1 and the second focal length f2 to satisfy the above-mentioned conditions. After the above-mentioned conditions are satisfied, the optical component 200 adjusts the translating image 400 from the original position to be projected at a new target position, as indicated as the translating image 400'. It is to be noted that the values of d and L1 remain constant, and the condition of d=f1+f2 has to be satisfied as well.

Figure 3:
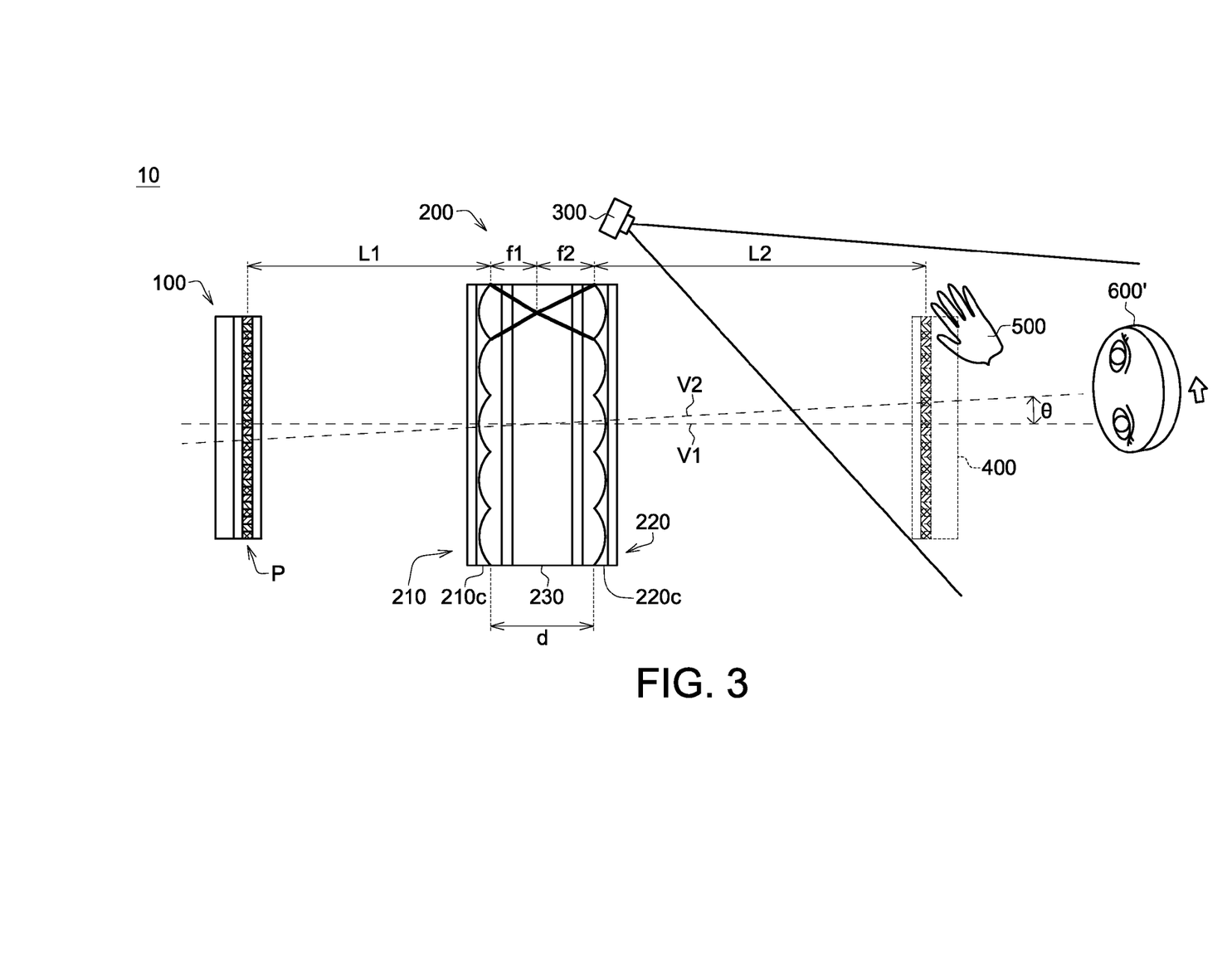

FIG. 3 is schematic view of the display device 10 according to an embodiment of the present disclosure showing another operating method thereof. In the present embodiment, the display device 10 can detect the change of a viewing angle by the movement of an object, such as a viewer's angular movement with respect to the display device or a viewer's eyes (gaze) movement, and adjust the translating image to be projected with a desired target sharpness value according to the new viewing angle of the object, allowing a flexible human interaction with the desired sharp translating image from a wider viewing angle.

Referring to FIG. 3, the sensing module 300 may include a body tracking module, and the object information may include a viewing angle from a position of the object. To be more specifically, the object information may include not only the original position of the object but also the new viewing angle of the object after the object is moved. The first focal length and the second focal length are adjusted for satisfying the following condition:

$$f1=(L1/(L1+L2))*(d/\cos(\theta)), f2=(L2/(L1+L2))*(d/\cos(\theta))$$

d/cos(θ) is the optical gap between the first LC GRIN lens array and the second LC GRIN lens array, and θ is the viewing angle from the position of the object. More specifically, the viewing angle θ is an angle difference between an original orthogonal line V1 from a viewer' eyes to the optical component 200 and a slightly shifted new orthogonal line V2 from the viewer' eyes 600' to the optical component 200.

In an embodiment, the viewing angle from the position of the object is |θ|<90 degrees. In another embodiment, |θ|<30 degrees. For example, the viewing angle θ from the position of the object may be between +30 degrees and −30 degrees.

For example, when an object, such as a viewer's eyes, is moved from the original position to a new position by a viewing angle with respect to the display device, as indicated as the eyes 600', the control module adjusts the first focal length f1 and the second focal length f2 to satisfy the above-mentioned conditions. After the above-mentioned conditions are satisfied, the optical component 200 adjusts the translating image 400 to reach a target sharpness value. It is to be noted that the values of d and L1 remain constant, and with the orthogonal line V1 from a viewer' eyes to the optical component 200 being shifted to the new line V2, the optical gap is defined as d/cos(e) in the present embodiment, and the condition of d/cos(θ)=f1+f2 has to be satisfied.

Figure 4:
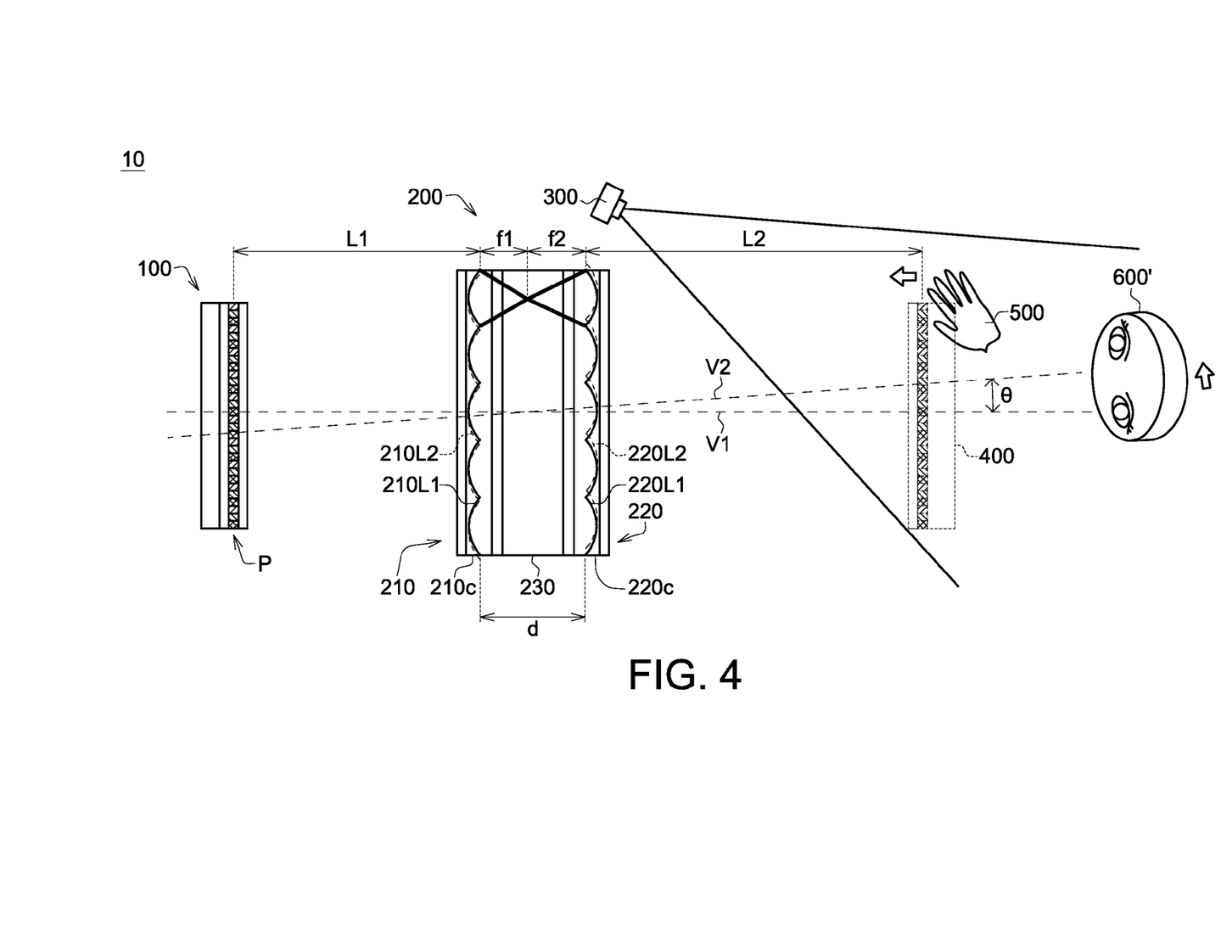

FIG. 4 is schematic view of the display device 10 according to an embodiment of the present disclosure showing an additional operating method thereof. In the present embodiment, the display device 10 can detect the change of a viewing angle with respect to the display device by the movement of an object, such as a viewer's eyes or gaze movement, and adjust the translating image to be projected with a desired target sharpness value according to the new viewing angle of the object, allowing a flexible human interaction with the desired sharp translating image from a wider viewing angle.

Referring to FIG. 4, by applying the first bias arrangement to the first LC GRIN lens array 210 and applying the second bias arrangement to the second LC GRIN lens array 220 according to the viewing angle information, the positions of the optical lens 210L1 of the first LC GRIN lens array 210 and the positions of the optical lens 220L1 of the second LC GRIN lens array 220 are adjusted and shifted to new positions until the translating image 400 reaches a target sharpness value.

For example, as shown in FIG. 4, while the viewer's eyes are located at a viewing angle θ, the positions of the optical lens 210L1 of the first LC GRIN lens array 210 are shifted to new positions, as indicated as optical lens 210L2, and the positions of the optical lens 220L1 of the second LC GRIN lens array 220 are shifted to new positions, as indicated as optical lens 220L2. As such, the sharpness of the as-formed translating image 400 reaches a target value, providing a desired sharp translating image 400.

Figure 5:
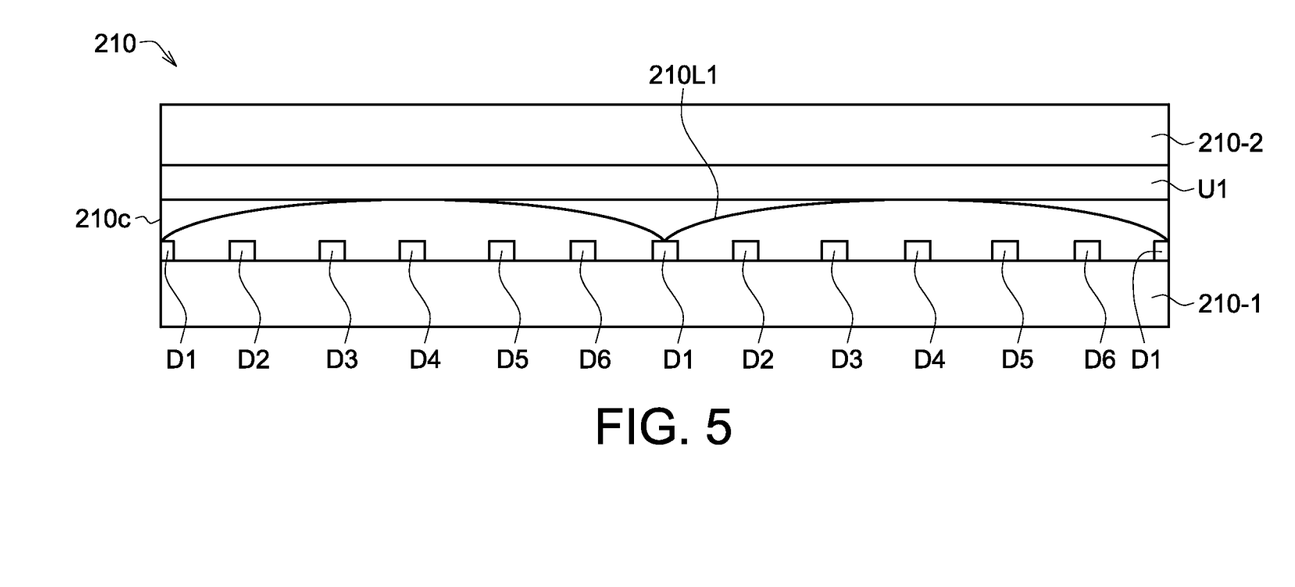
FIG. 5 is a schematic view of a liquid crystal (LC) gradient index (GRIN) lens array according to an embodiment of the present disclosure.

For further explaining and describing the bias arrangement, please refer to FIG. 5, which a schematic view of a LC GRIN lens array according to an embodiment of the present disclosure. The first LC GRIN lens array 210 is taken as an example. The first LC GRIN lens array 210 includes transparent substrates 210-1 and 210-2, strip electrodes D1-D6 disposed on the transparent substrate 210-1, an electrode layer U1, and the liquid crystal layer 210c disposed between the strip electrodes D1-D6 and the electrode layer U1. Different strip electrodes D1-D6 are applied with different predetermined voltages, causing different tilt angles of the corresponding liquid crystal molecules, thereby generating optical lens 210L1 within the liquid crystal layer 210c, and such arrangement of different applied voltages applied to the electrodes of the first LC GRIN lens array is defined as the first bias arrangement. In the embodiments of the present disclosure, the electrode layer U1 may be a planar electrode layer or may include strip electrodes arranged orthogonal to the strip electrodes D1-D6 as well.

For example, the applied voltages to the electrodes may be 0V for the electrode layer U1 and the strip electrodes D4, 5V for the strip electrodes D1, 2V for the strip electrodes D2 and D6, and 0.5V for the strip electrodes D3 and D5. In another embodiment, the applied voltages to the electrodes may be 0V for the electrode layer U1 and the strip electrodes D5, 5V for the strip electrodes D2, 2V for the strip electrodes D1 and D3, and 0.5V for the strip electrodes D4 and D6. While the bias arrangement is adjusted and varied, the focal length and/or the positions of the as-formed optical lens of the first LC GRIN lens array 210 may vary and shift. The embodiment as illustrated in FIG. 5 shows a 6 multi-electrode type of the strip electrodes, however, the selections of the number of the electrodes in a set of the strip electrodes are not limited to 6 and may vary according to actual needs.

Figure 6:
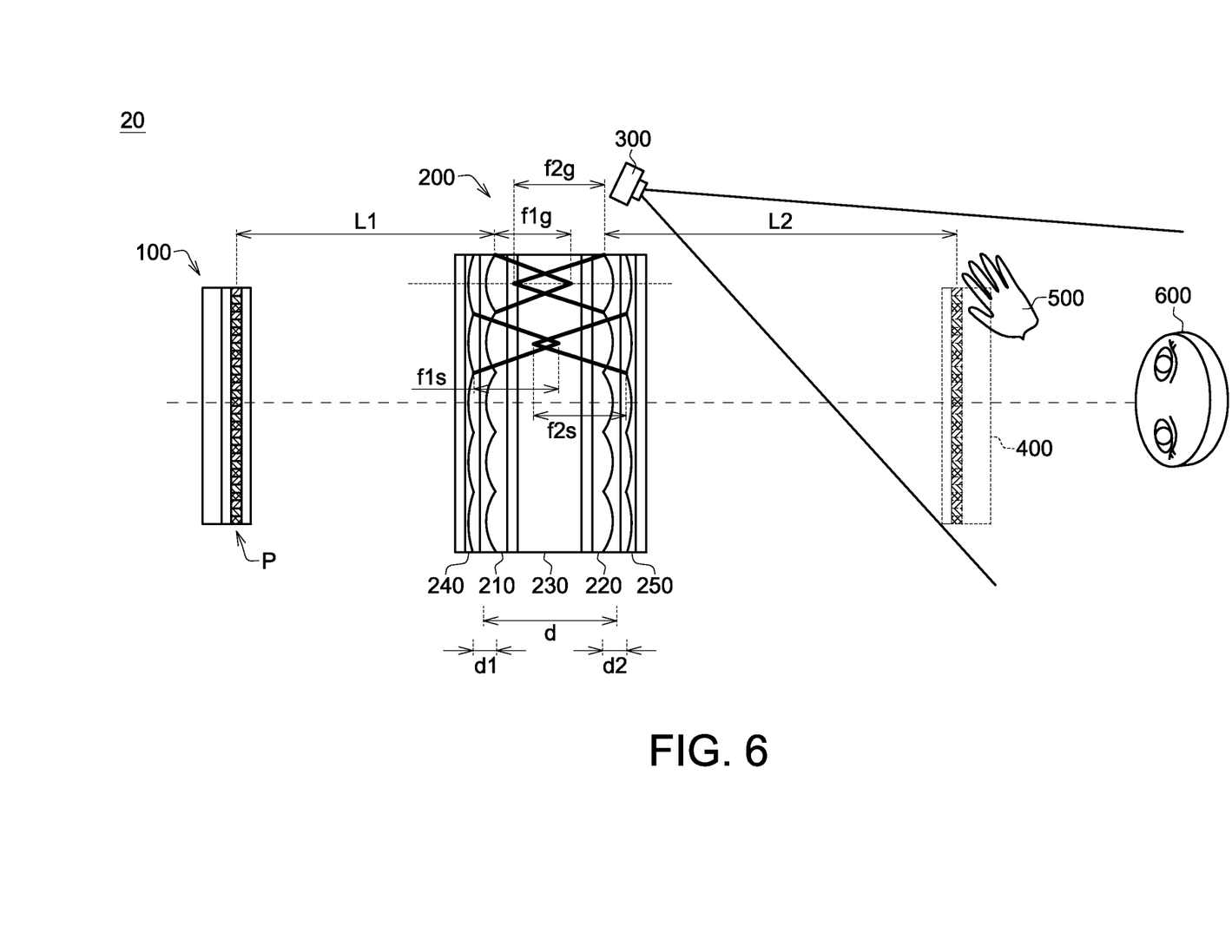
FIG. 6 is a schematic view of a display device according to another embodiment of the present disclosure.

FIG. 6 is a schematic view of a display device 20 according to another embodiment of the present disclosure. The elements in the present embodiment sharing the same or similar labels with those in the previous embodiment are the same or similar elements, and the description of which is omitted.

Referring to FIG. 6, the optical component 200 of the display device 20 may further include a first lens array 240 and a second lens array 250. The first lens array 240 has a third focal length, and the second lens array 250 has a fourth focal length. The first lens array 240 is disposed on the first LC GRIN lens array 210, and the second lens array 250 is disposed on the second LC GRIN lens array 220 and arranged parallel to the first lens array 240. In the embodiment, the first lens array 240 and the second lens array 250 are such as lenticular lens arrays or micro lens arrays.

As shown in FIG. 6, the first LC GRIN lens array 210 and the second LC GRIN lens array 220 are disposed between the first lens array 240 and the second lens array 250. In the present embodiment, the third focal length and the fourth focal length are fixed values and cannot be adjusted.

In the display device 20 as shown in FIG. 6, the first LC GRIN lens array 210 and the first lens array 240 form a first lens set, and the second LC GRIN lens array 220 and the second lens array 250 form a second lens set. When operating the display device 20, the step of adjusting the translating image 400 may include adjusting the first focal length of the first LC GRIN lens array 210 and adjusting the second focal length of the second LC GRIN lens array 220 until the translating image 400 reaches a target position. In such case, the first focal length and the second focal length are adjusted for satisfying the following condition:

$$d=f1+f2, L2=L1*(f2/f1), 1/f1=1/f1s+1/f1g-d1/(f1s*f1g),$$
$$1/f2=1/f2s+1/f2g-d2/(f2s*f2g)$$

f1 is a total focal length of the first lens set, f2 is a total focal length of the second lens set, f1g is the first focal length, f2g is the second focal length, f1s is the third focal length, f2s is the fourth focal length, d1 is the optical gap between the first LC GRIN lens array 210 and the first lens array 240, d2 is the optical gap between the second LC GRIN lens array 220 and the second lens array 250, d is the optical gap between the first lens set and the second lens set, L1 is a distance between the first lens set and the display module 100, and L2 is a distance between the second lens set and an original position of the translating image 400.

With the addition of the first lens array 240 and the second lens array 250, the first lens set and the second lens set are provided with higher lens ability. Moreover, with the support from the first lens array 240 and the second lens array 250, the thicknesses of the liquid crystal layers 210c and 220c can be reduced while the whole optical component 200 having the same focus adjusting abilities, thereby a faster response time is achieved, and a lower voltage is required with low power consumption result.

Figure 7:
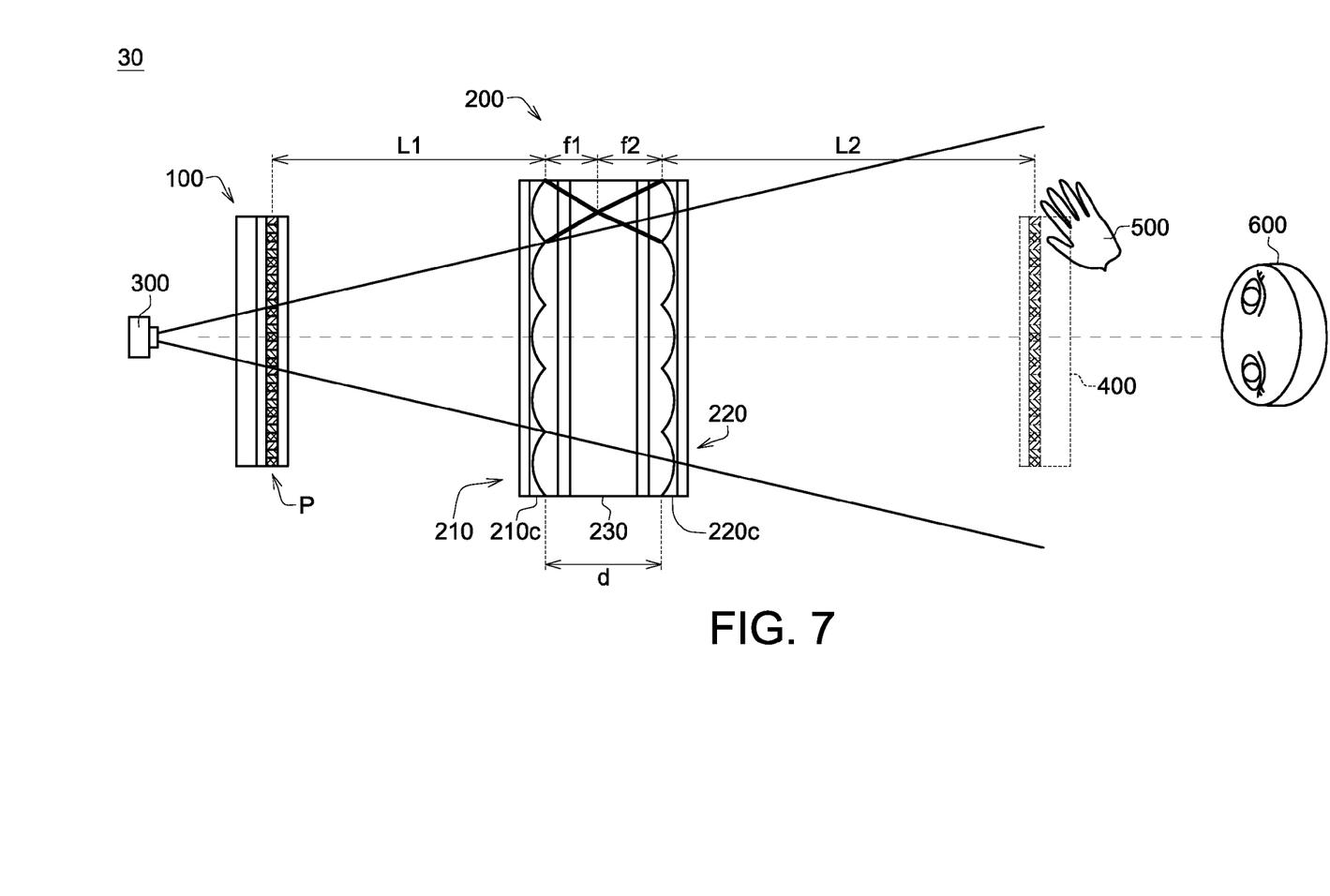
FIG. 7 is a schematic view of a display device according to a further embodiment of the present disclosure.

FIG. 7 is a schematic view of a display device 30 according to a further embodiment of the present disclosure. The elements in the present embodiment sharing the same or similar labels with those in the previous embodiment are the same or similar elements, and the description of which is omitted. The main difference of the present embodiment from the embodiment as shown in FIG. 1 is the sensing module 300.

In the present embodiment, the sensing module 300 is such as an image capture device. When the display device 30 is under operation, an image of the viewer's hand 500 or the viewer's eye 600 is captured by the image capture device, and then the image from the sensing module 300 (image capture device) is received and analyzed by the control module. Next, a first bias arrangement is applied to the first LC GRIN lens array 210 and a second bias arrangement is applied to the second LC GRIN lens array 220 according to the received image until the translating image 400 reaches a target sharpness value.

In some embodiments according to the present disclosure, the sensing module may include a body tracking module and an image capture device (not shown in drawings). In such case, the object information may include a position of the object, a viewing angle from the position of the object, or a combination of both, and the object information may further include an image of the object, and the first focal length and the second focal length are adjusted until the translating image 400 reaches a target sharpness value. In such system, the body tracking module carries out the main function of the sensing module, and the image capture device is used as a supportive system to fine-tune the focal lengths of the first LC GRIN lens array and the second LC GRIN lens array.

In some embodiments according to the present disclosure, the LC GRIN lens arrays may be replaced by electro-wetting lens arrays, and the focal lengths of the electro-wetting lens array may vary according to the applied voltages as well.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display device, comprising:
    a display module configured for providing an original image;
    an optical component disposed on the display module configured for projecting a translating image of the original image;
    a sensing module configured for detecting an object; and
    a control module configured for receiving an object information from the sensing module and adjusting the translating image;
    wherein the optical component comprises:
        a first liquid crystal (LC) gradient index (GRIN) lens array having a first focal length;
        a second LC GRIN lens array having a second focal length and arranged parallel to the first LC GRIN lens array;
        a first lens array having a third focal length, disposed on the first LC GRIN lens array; and a second lens array having a fourth focal length, disposed on the second LC GRIN lens array and arranged parallel to the first lens array;

wherein the control module adjusts the translating image by applying a first bias arrangement to the first LC GRIN lens array and a second bias arrangement to the second LC GRIN lens array according to the object information.

2. The display device according to claim 1, wherein the control module adjusts the translating image according to the object information until the translating image reaches a predetermined criteria, and the predetermined criteria comprises a target position of the translating image according to the object information, a target sharpness value of the translating image, or a combination of both.

3. The display device according to claim 1, wherein the sensing module comprises a body tracking module, an image capture device, or a combination of both.

4. The display device according to claim 1, wherein the third focal length and the fourth focal length are fixed values.

5. The display device according to claim 1, wherein the first LC GRIN lens array and the second LC GRIN lens array are disposed between the first lens array and the second lens array.

6. An operating method of a display device, comprising:
providing an original image from a display module;
projecting a translating image of the original image by an optical component;
detecting an object by a sensing module;
receiving an object information from the sensing module by a control module; and
adjusting the translating image by the control module;
wherein the optical component comprises:
  a first LC GRIN lens array having a first focal length;
  a second LC GRIN lens array having a second focal length and arranged parallel to the first LC GRIN lens array;
  a first lens array having a third focal length, disposed on the first LC GRIN lens array; and
  a second lens array having a fourth focal length, disposed on the second LC GRIN lens array and arranged parallel to the first lens array;
wherein the control module adjusts the translating image by applying a first bias arrangement to the first LC GRIN lens array and a second bias arrangement to the second LC GRIN lens array according to the object information.

7. The operating method of the display device according to claim 6, wherein the control module adjusts the translating image according to the object information until the translating image reaches a predetermined criteria, and the predetermined criteria comprises a target position of the translating image according to the object information, a target sharpness value of the translating image, or a combination of both.

8. The operating method of the display device according to claim 6, wherein adjusting the translating image comprises:
adjusting the first focal length and the second focal length until the translating image reaches a target position, wherein the first focal length and the second focal length are adjusted for satisfying: $d=f1+f2$ and $L2=L1*(f2/f1)$, f1 is the first focal length, f2 is the second focal length, d is the optical gap between the first LC GRIN lens array and the second LC GRIN lens array, L1 is a distance between the first LC GRIN lens array and the display module, and L2 is a distance between the second LC GRIN lens array and an original position of the translating image.

9. The operating method of the display device according to claim 6, wherein the sensing module comprises a body tracking module, and the object information comprises a position of the object.

10. The operating method of the display device according to claim 9, wherein the object information further comprises a distance between the second LC GRIN lens array and the position of the object, and the first focal length and the second focal length are adjusted for satisfying: $f1=(L1/(L1+L2'))*d$, $f2=(L2/(L1+L2'))*d$, f1 is the first focal length, f2 is the second focal length, d is the optical gap between the first LC GRIN lens array and the second LC GRIN lens array, L1 is a distance between the first LC GRIN lens array and the display module, L2 is a distance between the second LC GRIN lens array and an original position of the floating image, and L2' is the distance between the second LC GRIN lens array and the position of the object.

11. The operating method of the display device according to claim 6, wherein the sensing module comprises a body tracking module, the object information comprises a viewing angle from a position of the object.

12. The operating method of the display device according to claim 11, wherein the first focal length and the second focal length are adjusted for satisfying: $f1=(L1/(L1+L2))*(d/\cos(\theta))$, $f2=(L2/(L1+L2))*(d/\cos(\theta))$, f1 is the first focal length, f2 is the second focal length, $d/\cos(\theta)$ is the optical gap between the first LC GRIN lens array and the second LC GRIN lens array, L1 is a distance between the first LC GRIN lens array and the display module, L2 is a distance between the second LC GRIN lens array and an original position of the translating image, and $\theta$ is the viewing angle from the position of the object.

13. The operating method of the display device according to claim 12, wherein the viewing angle from the position of the object is between +30 degrees and −30 degrees.

14. The operating method of the display device according to claim 11, wherein adjusting the translating image comprises:
shifting positions of optical lens of the first LC GRIN lens array and the second LC GRIN lens array until the translating image reaches a target sharpness value.

15. The operating method of the display device according to claim 6, wherein the first LC GRIN lens array and the second LC GRIN lens array are disposed between the first lens array and the second lens array.

16. The operating method of the display device according to claim 6, wherein the first LC GRIN lens array and the first lens array form a first lens set, the second LC GRIN lens array and the second lens array form a second lens set, and adjusting the translating image comprises:
adjusting the first focal length and the second focal length until the floating image reaches a target position, wherein the first focal length and the second focal length are adjusted for satisfying: $d=f1+f2$, $L2=L1*(f2/f1)$, $1/f1=1/f1s+1/f1g-d1/(f1s*f1g)$, $1/f2=1/f2s+1/f2g-d2/(f2s*f2g)$, f1 is a total focal length of the first lens set, f2 is a total focal length of the second lens set, f1g is the first focal length, f2g is the second focal length, f1s is the third focal length, f2s is the fourth focal length, d1 is the optical gap between the first LC GRIN lens array and the first lens array, d2 is the optical gap between the second LC GRIN lens array and the second lens array, d is the optical gap between the first lens set and the second lens set, L1 is a distance between the first lens set and the display module, and L2 is a distance between the second lens set and an original position of the translating image.

17. The operating method of the display device according to claim 6, wherein the sensing module comprises a body tracking module and an image capture device, the object information comprises a position of the object, a viewing angle from the position of the object, or a combination of both, the object information further comprises an image of the object, and the first focal length and the second focal length are adjusted until the translating image reaches a target sharpness value.

18. An operating method of a display device, comprising:
providing an original image from a display module;
projecting a translating image of the original image by an optical component;
capturing an image of an object by an image capture device;
receiving and analyzing the image from the image capture device by a control module; and
adjusting the translating image by the control module;
wherein the optical component comprises:
  a first LC GRIN lens array having a first focal length;
  a second LC GRIN lens array having a second focal length and arranged parallel to the first LC GRIN lens array;
  a first lens array having a third focal length, disposed on the first LC GRIN lens array; and
  a second lens array having a fourth focal length, disposed on the second LC GRIN lens array and arranged parallel to the first lens array;
wherein the control module adjusts the translating image by applying a first bias arrangement to the first LC GRIN lens array and a second bias arrangement to the second LC GRIN lens array according to the received image.

* * * * *